US010885647B2

(12) United States Patent
Tamarozzi et al.

(10) Patent No.: US 10,885,647 B2
(45) Date of Patent: Jan. 5, 2021

(54) ESTIMATION OF ELECTROMECHANICAL QUANTITIES BY MEANS OF DIGITAL IMAGES AND MODEL-BASED FILTERING TECHNIQUES

(71) Applicant: KATHOLIEKE UNIVERSITEIT LEUVEN, Leuven (BE)

(72) Inventors: Tommaso Tamarozzi, Leuven (BE); Francesco Cosco, Leuven (BE); Frank Naets, Leuven (BE); Bert Pluymers, Leuven (BE); Wim Desmet, Leuven (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 139 days.

(21) Appl. No.: 16/098,567

(22) PCT Filed: May 2, 2017

(86) PCT No.: PCT/EP2017/060442
§ 371 (c)(1),
(2) Date: Nov. 2, 2018

(87) PCT Pub. No.: WO2017/191146
PCT Pub. Date: Nov. 9, 2017

(65) Prior Publication Data
US 2019/0139241 A1 May 9, 2019

(30) Foreign Application Priority Data

May 2, 2016 (GB) .................................. 1607639.0

(51) Int. Cl.
*G06T 7/521* (2017.01)
*G01L 25/00* (2006.01)
(Continued)

(52) U.S. Cl.
CPC ............ *G06T 7/521* (2017.01); *B60G 17/019* (2013.01); *B60G 17/0185* (2013.01);
(Continued)

(58) Field of Classification Search
CPC ......... G06T 7/149; G06T 7/70; G06T 7/0004; G06T 7/001; G06T 7/521;
(Continued)

(56) References Cited

U.S. PATENT DOCUMENTS 9,412,040 B2   8/2016  Feng et al.
2009/0297020 A1  12/2009  Beardsley et al.
(Continued)

FOREIGN PATENT DOCUMENTS

CN   101901498 A   12/2010
CN   104825133 A   8/2015
(Continued)

OTHER PUBLICATIONS

Great Britain Search Report from GB Application No. 1607639.0, dated Nov. 3, 2016.
(Continued)

*Primary Examiner* — Diane D Mizrahi
(74) *Attorney, Agent, or Firm* — Workman Nydegger

(57) ABSTRACT

A method for estimating one or more of the following quantities from an electromechanical machine and/or component, the method comprising the creation of a photorealistic numerical model of the electromechanical machine or parts of it, a measurements step for combining outputs of physical sensors of which at least one is an imaging device for visualizing the external surface of the physical electromechanical machine in at least one 2-dimensional image, an estimation step combining the photorealistic numerical model and measurement step to provide an estimate of desired electromechanical quantities, wherein the estimation
(Continued)

step is based at least on the usage of a similarity metric between the (at least one) two dimensional image of the electromechanical machine or parts of it and the images generated by the photorealistic numerical model.

20 Claims, 11 Drawing Sheets

(51) Int. Cl.
| | |
|---|---|
| *B60G 17/0185* | (2006.01) |
| *G06T 7/00* | (2017.01) |
| *G01M 11/08* | (2006.01) |
| *H02P 23/00* | (2016.01) |
| *B60G 17/019* | (2006.01) |
| *G06T 11/00* | (2006.01) |
| *G06T 15/00* | (2011.01) |
| *G06T 17/05* | (2011.01) |
| *G01P 15/00* | (2006.01) |

(52) U.S. Cl.
CPC ............ *G01L 25/00* (2013.01); *G01M 11/081* (2013.01); *G06T 7/001* (2013.01); *G06T 7/0004* (2013.01); *G06T 11/001* (2013.01); *G06T 15/005* (2013.01); *G06T 17/05* (2013.01); *H02P 23/0022* (2013.01); *B60G 2401/14* (2013.01); *B60G 2401/142* (2013.01); *B60G 2600/08* (2013.01); *G01P 15/00* (2013.01); *G06T 2207/30164* (2013.01)

(58) Field of Classification Search
CPC ......... G06T 2207/30164; G06T 11/001; G06T 15/005; G06T 17/05; B60G 17/0185; B60G 17/019; B60G 2401/14; B60G 2401/142; B60G 2600/08; G01L 25/00; G01M 11/081; H02P 23/0022; G01P 15/00

See application file for complete search history.

(56) References Cited

U.S. PATENT DOCUMENTS

| | | | |
|---|---|---|---|
| 2015/0310672 A1* | 10/2015 | Choukroun | ............ H04N 5/265 |
| | | | 345/633 |
| 2016/0232712 A1* | 8/2016 | Choukroun | ........... G06T 17/205 |
| 2017/0323478 A1* | 11/2017 | Mattila | .............. G06K 9/00671 |
| 2020/0118342 A1* | 4/2020 | Varshney | .............. G06T 15/205 |

FOREIGN PATENT DOCUMENTS

| | | |
|---|---|---|
| EP | 1980843 A1 | 10/2008 |
| GB | 2504822 A | 2/2014 |
| WO | 2012040709 A2 | 3/2012 |
| WO | 2012109618 A2 | 8/2012 |
| WO | 2014055355 A2 | 4/2014 |
| WO | 2014127321 A2 | 8/2014 |
| WO | 2015153832 A1 | 10/2015 |

OTHER PUBLICATIONS

International Search Report from PCT Application No. PCT/EP2017/060442, dated Aug. 28, 2017.

Faure et al., "SOFA, a Multi-Model Framework for Interactive Physical Simulation," Soft Tissue Biomechanical Modeling for Computer Assisted Surgery, Springer, Mar. 21, 2012, 39 Pages.

Szilagyi et al., "A Patient Specific Electro-Mechanical Model of the Heart," Computer Methods and Programs in Biomedicine, vol. 101, 2011, pp. 183-200.

Sermesant et al., "An Electromechanical Model of the Heart for Image Analysis and Simulation," IEEE Transactions on Medical Imaging, vol. 25, No. 5, May 2006, pp. 612-625.

\* cited by examiner

```
┌─────────────────────────────────────┐
│ Providing a photorealistic electromechanical │
│   numerical model of an physical    │
│   electromechanical machine and/or  │
│             component.              │
└─────────────────────────────────────┘
                  │
┌─────────────────────────────────────┐
│  Acquiring videos or images thanks to a │
│  camera of the physical electromechanical │
│        machine and/or component.    │
└─────────────────────────────────────┘
                  │
┌─────────────────────────────────────┐
│        Simulate the photorealistic   │
│   electromechanical numerical model and │
│   estimate variables by using one or more │
│   similarity measures obtained comparing │
│     images or video of the physical │
│    electromechanical machine and/or │
│    component against Images of the  │
│  photorealistic electromechanical numerical │
│                model                │
└─────────────────────────────────────┘
```

FIG. 1

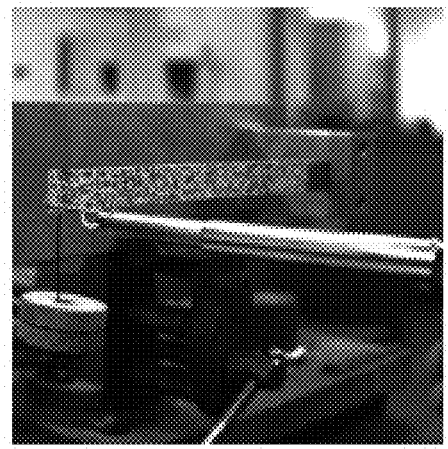
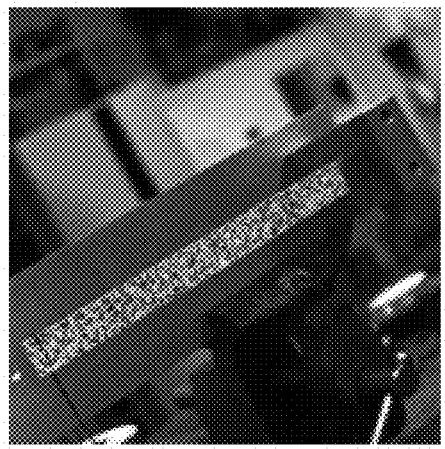
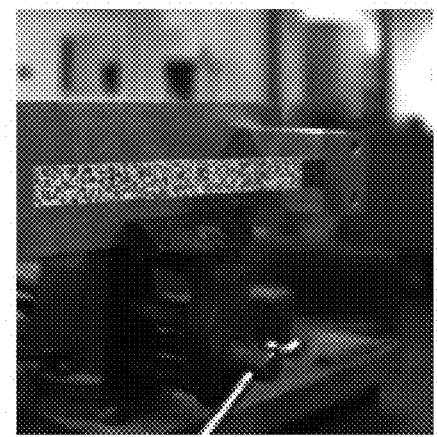
FIG. 6

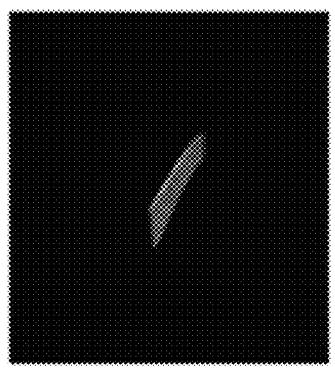
FIG. 7A
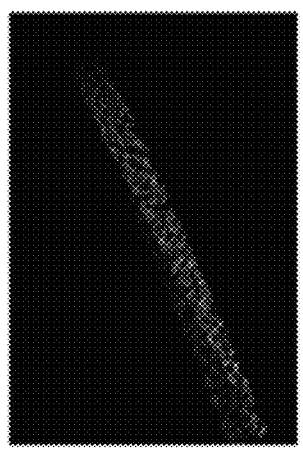 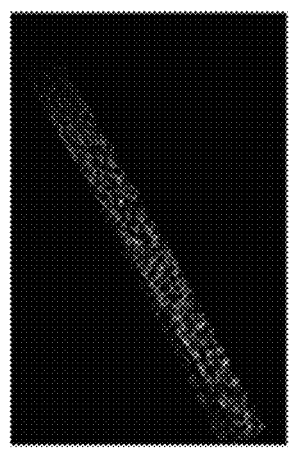 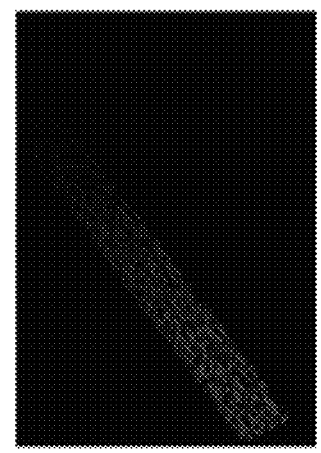
FIG. 7B

| Hardware System Clarification | | |
|---|---|---|
| Sensors | DAQ (Digital Acquisition Systems) | Processing System |
| • Accelerometers<br>• High-speed video camera | • Amplifier<br>• AD converter<br>• Frame-grabber<br>• Trigger system | One laptop/desktop PC with the following softwares functionalities:<br>• DAQ software<br>• Frame-grabber control<br>• Camera Control |
| Setup 1 | | |

FIG. 9

Preparation step

Model definition and creation
- Creation of geometry (point cloud, CAD etc...)
- Preparation of the electromechanical numerical model (e.g. FE model, flexible multibody model)
- Model order reduction

Photorealistic model creation
- Model registration
- Image based rendering and texture mapping on the electromechanical numerical model

Estimation phase

Measurements acquisition
- Acquisition of videos or images thanks to a camera of the physical electromechanical machine and/or component
- Acquisition of other sensor data to improve estimation (optional)
- Storage of measured data

Simulation and estimation
- Simulate the photorealistic electromechanical numerical model in time domain coupled with an estimation strategy such as e.g. Kalman-based filetering, Moving Horizon Estimation, Luenberger observer, etc.
- Usage of one or more similarity measures obtained comparing images or video of the physical electromechanical machine and/or component against Images of the photorealistic electromechanical numerical model within the estimation framework
- Complement the estimation with other sensor data (optional)
- Applications to:
  - Model-updating
  - States-input-parameters estimation of electromechanical quantities

FIG. 10

ESTIMATION OF ELECTROMECHANICAL QUANTITIES BY MEANS OF DIGITAL IMAGES AND MODEL-BASED FILTERING TECHNIQUES

FIELD OF THE INVENTION

The present invention relates generally to the field of model-based estimation of electromechanical quantities. More specifically the present invention relates to estimation of electromechanical quantities by means of digital images and model-based filtering techniques thanks to the aid of a photorealistic electromechanical numerical model.

BACKGROUND OF THE INVENTION

In recent years several methods to combine experimental measurements with numerical representations ('models') of electromechanical or mechatronic machines and/or components have been proposed in order to infer (estimate) information which is difficult to or cannot be measured directly.

Different methods were presented and tuned for increasing levels of complexity ranging from a single undeformable body (e.g. for pose estimation) to lumped parameters system models to (reduced) linear and nonlinear finite element models and flexible multibody. These techniques have been applied successfully in both academic and industrial environments. All of them share a fundamental core functionality: they exploit the knowledge embedded in the model in order to estimate a set of model variables (model states, inputs, parameters or any combination of them) while minimizing in some (weighted) sense the difference between the measured (through a physical sensor on a physical object/system) and the predicted quantities (obtained from the numerical model evaluation).

The connection between the model and the measurements is achieved through inverse or estimation algorithms. General optimization algorithms can be used for adjusting a certain model variable in order for the model to best match the measurements. Specific techniques like Kalman filtering and Moving Horizon Estimation can be used to obtain an optimal trade-off between the numerical model and measurement accuracy for the resulting estimation.

Different measurements are used for different applications. Often discrete sensors (accelerometers, strain gauges, microphones, etc.) are used which can be linked directly to one or more model variables. Increasing interest has been recently pointed towards the use of field measurements (like digital video frames, videos and camera images) due to their unique capability to collect high density spatial data from a scene of interest.

Current state of the art methods hardly exploit the full range of information captured from full field sensors (e.g. camera sensors). Methods have focused on extracting information only for rigid pose estimation, which requires much less accurate processing and model information. The latter is for example described in international patent application WO2014/055355, US patent application US2009/0297020 and GB patent application GB2504822. Their use as of visual measurement tools has been usually complemented by some sort of middle-ware in order to obtain a relatively smaller number of data points which can be used as discrete measurement points (e.g. point cloud generation for pose estimation, feature tracking for location measurement as for example described in international patent application WO 2012/0407009 and U.S. Pat. No. 9,412,040); or to retrieve indirect measured quantities (a specific example hereof is the Digital Image Correlation where image information is converted in an estimated strain measurement on a structure). As a consequence, the field measurement from the camera has never been fully and directly exploited within an estimation framework.

This leads to several limitations of the above described existing approaches:

When relying on discrete sensors:
different types of sensors are required for estimating different quantities;
an infeasibly large number of sensors might be required in order to provide sufficient accuracy;
discrete sensors tend to be intrusive (presence of the sensors perturbs the quantity under investigation);
When relying on field sensors:
information is often manipulated to generate discrete measurement points. As such, most of the data available is lost as the available model information is not optimally matched to the available sensor information.
Information is often processed in order to extract full-field quantities by means of other methodologies (e.g. DIC), where valuable knowledge about the physical system/object cannot be exploited in order to improve accuracy.
The pure field measurement approaches may require some preparation of the structure under consideration.
In case of 3D electromechanical machine and/or components, the available methods require at least one stereo-rig for each side of the electromechanical machine and/or component under investigation, which quickly leads to expensive requirements for realistic structures. These methods also only provide information on the visible parts of the structure, but do not provide any insight in invisible quantities (e.g. internal strains).
Methods employing more expensive imaging techniques can be used (Computed Tomography Images CTI, Magnetic Resonance Imaging Mill, Single-Photon Emission Computed Tomography SPECT, Positron Emission Tomography PET, etc) but need a controlled environment and are not directly applicable to electromechanical machines and components during e.g. their regular operation. Moreover the mentioned techniques allow for 3D images of the system including internal non-visible parts which is not necessary in electromechanical applications and dramatically increases the cost of the method. Moreover the majority of these methods can be used only for static or quasi-static image acquisitions, and their use for electromechanical applications is hard if not even impossible due to the disturbance of the magnetic fields introduced by the measuring apparatus.

In International patent application WO2014/127321, images coming from expensive and intrusive medical devices such as CTI, MRI, SPECT or PET are used to evaluate the position of the organs of a human body during surgery and help the surgeon to understand the exact location of delicate parts that are difficult if not impossible to see with less accurate intra-operative means. It exploits such 3D medical images in combination with a numerical model to solve an optimization problem that finally allows to create a 3D model of the human body organs deformed during operations and overlay it on the less accurate intra-operative images. This allows the doctor to see a numerically created and more detailed model of the patient's organs. While this approach is very interesting it lacks the capacity to reach the level of accuracy and dynamic range on the estimated quantities combined with the computational efficiency that is necessary in electromechanical applications. Moreover it is not applicable as such to electromechanical machines and/or components working in their operational environment.

Therefor there is a need for novel and improved model based sensing methods.

SUMMARY OF THE INVENTION

It is an object of embodiments of the present invention to provide estimation of electromechanical quantities by means of digital images and model-based filtering techniques. The above objective is accomplished by a method and device according to the present invention.

It is an advantage of embodiments of the present invention that these can make use of low cost images, i.e. stemming from low cost imaging techniques such as video and/or photo camera images. It is an advantage of embodiments of the present invention that 2D images of visible parts can be used. It thus is an advantage that embodiments do not require internal images or images that are large or expensive, e.g. as obtained from 3D devices such as CTI, MRI, SPECT or PET. It is an advantage of embodiments of the present invention that use is made of model-based filtering in order to infer surface but also internal quantities of electromechanical systems such as for example machines.

It is an advantage of embodiments according to the present invention that the time-history of the estimated quantities and/or of the image information is exploited. The latter allows to cover transient dynamic motion, which is key in electromagnetic applications. It is an advantage of embodiments of the present invention that a vision based approach is coupled with dynamic estimators, such as for example Kalman-based filters and/or Moving Horizon estimators.

It is an advantage of embodiments according to the present invention that high fidelity models are used allowing to obtain the required level of accuracy. Large computational burdens are avoided by adopting advanced model order reduction schemes, where required.

In a first aspect the present invention provides a method of sensing a physical object, the method comprising providing a photorealistic virtual object of the physical object, performing a measurement step, the measurement step comprising recording the physical object and acquiring physical field measurements of the physical object comprising at least one 2 dimensional image and performing an estimation step, the estimation step comprising applying external excitations to the photorealistic virtual object to create photorealistic virtual field measurements and comparing the photorealistic virtual field measurements with the physical field measurements and therefor sensing the physical object.

The method may comprise using a time-history of the at least one 2 dimensional image.

Sensing a physical object may comprise estimating one or more of the following quantities of the physical object, e.g. one or more of the following electromechanical quantities from an electromechanical machine or component:
  States: including but not limited to positions, velocities, accelerations, strains, strain rates, currents;
  Input: including but not limited to mechanical forces, mechanical torques, mechanical pressures, voltages;
  Parameters: including but not limited to density, Young's moduli, Poisson's ratios, material parameters, physical dimensions, resistance, capacitance.

The method may comprise providing a time history of the estimate of said quantities of the physical object.

The physical object may be an electromechanical machine and/or component.

Providing a photorealistic virtual object may comprise the creation of a photorealistic numerical model of the physical object.

Performing a measurement step may comprise combining outputs of physical sensors of which at least one is an imaging device for visualising the external surface of the physical object in at least one 2 dimensional image.

Performing an estimation step may comprise combining the photorealistic virtual field measurements with the physical field measurements to provide an estimate of the desired quantity or quantities and wherein the estimation step is based at least on the usage of a similarity metric between the at least one two dimensional image of the physical object or parts of it and the images generated by the photorealistic virtual object.

Performing an estimation step may comprise combining the photorealistic numerical model and measurement step to provide an estimate of desired electromechanical quantities and wherein the estimation step is based at least on the usage of a similarity metric between the at least one two dimensional image of the electromechanical machine or parts of it and the images generated by the photorealistic numerical model.

The physical behavior of the photorealistic virtual object of the physical object may be described by a static or dynamic model obtained as a discretized approximation of a system.

It is an advantage of embodiments of the present invention that images or sensors that generally capture 2D images of an electromechanical machine and/or component, are combined with numerical models that are capable of representing localized and distributed fields. A more effective way of combining camera images and videos into an estimation frameworks is provided, exploiting the full potential of the measured information.

In preferred embodiments the physical behavior of the photorealistic electromechanical numerical model is described by a static or dynamic model obtained as a discretized approximation of a system described by ordinary differential, partial differential or differential-algebraic equations such as but not limited to: lumped parameter models, finite element models, computational fluid dynamics models, flexible multibody models or combinations of them.

In preferred embodiments the photorealistic electromechanical numerical model is made computationally efficient by the usage of one or more linear and non-linear model order reduction techniques. The high accuracy may be guaranteed by a high dimensional description of the electromechanical model or at least of the parts of it that are compared with camera images and/or videos. The high accuracy is needed in order to obtain quantitative results while the model order reduction is needed to preserve computational accuracy of such computationally expensive models. As the model is solved in the time domain, this is required to reach acceptable computational loads. The one or more linear or non-linear model order reduction techniques may be one or more of component modes synthesis, Krylov based methods, proper orthogonal decomposition, dynamic mode decomposition, balanced truncation, discrete empirical interpolation method, energy conserving sampling and weighting.

These techniques intrinsically allow to treat dynamic effects and the time history of the electromechanical estimated quantities providing an optimal tradeoff (in some defined sense) between the image accuracy and the model accuracy. In preferred embodiments the estimation is obtained from dynamic filtering techniques combining both digital images and the photorealistic electromechanical numerical model. These techniques include but are not limited to: Kalman filter-based techniques, Moving Horizon Estimation techniques, Luenberger observer, etc.

In preferred embodiments the estimator allows for evaluation of stochastic error bounds of the estimated electromechanical quantities.

The model may be solved in the time domain;

The estimation may be obtained from a dynamic filtering techniques combining both videos, images and the photorealistic numerical model.

The estimation step may allow for evaluation of stochastic error bounds of the estimated quantities of the physical object.

The method may comprise measuring and using a subset of the quantities of the physical object as a known input to the photorealistic virtual object.

The method may comprise measuring and using further electromechanical quantities in addition to videos and camera images during the estimation step.

In preferred embodiments a subset of the electromechanical quantities are known. These known quantities are used to improve on the accuracy of the remaining estimated quantities within the estimation algorithm.

In preferred embodiments a subset of the electromechanical quantities are measured. These measured quantities are used to improve on the accuracy of the estimated quantities within the estimation algorithm. Such measurements include but are not limited to: strain gages, accelerometers, fiber bragg grating strain sensors, gyroscopes, voltage sensors, current sensors, temperature sensors, microphones, etc.

In preferred embodiments providing a photorealistic electromechanical numerical model comprises creating a numerical model of the physical electromechanical machine and/or component and texturizing the geometry of the model with at least one image.

In preferred embodiments the physical field measurements of the electromechanical machine are deformed physical fields.

In a second aspect, the present invention provides devices comprising a processing system, the processing system adapted to perform a method according to embodiments of the present invention.

In a third aspect, the present invention relates to a system for characterising a physical object, the system comprising at least one means for measuring quantities of the physical object and a processor adapted to receive the output of the at least one means for measuring fields of the physical object and adapted to perform the method as described above.

In one aspect, the present invention also provides a system for estimating electromechanical quantities, the system comprising:
  at least one means for acquiring digital images of the physical electromechanical machine,
  a processor adapted to receive the output of at least one means for obtaining images and videos of the physical electromechanical system and adapted to perform the method presented in preferred embodiments.

It is an advantage of embodiments that a photorealistic electromechanical numerical model is created such that it can be visualized from one or more different points of view and configurations and it visually resembles the physical electromechanical machine and/or component: in one word it is photoconsistent with the physical electromechanical machine and/or component.

The electromechanical numerical model can be rendered on any screen or device that allows its visualization.

A method according to embodiment of the present invention comprise several steps involving different technologies. It is an advantage of embodiments of the present invention that an optimal method is provided with high accuracy and large computational efficiency.

Computational efficiency may be enabled as follows: by using numerical model efficiency as detailed further in the invention description, 2D or 3D models might be used to create the photorealistic electromechanical numerical model. Techniques dedicated to obtain such numerical models are (but not limited to): linear and non-linear finite elements, finite volumes, finite differences, multibody and flexible multibody models, isogeometric models, or anyhow modelling methods allowing to discretize systems of algebraic, ordinary differential, partial differential and differential algebraic equations. The techniques described lead to an accurate numerical description of the physical electromechanical machine but often result in a very large number of degrees of freedom (up to several millions) and equations to be solved to obtain a representation of 2D and 3D distributed fields (positions, accelerations, strains, etc.). The computational burden required for the solution of this set of equations (e.g. equations of motion, estimation equations, etc.) can become prohibitive. In the last decades several techniques that allow for a faster but accurate solution have been developed under the name of linear and non-linear Model Order Reduction (MOR). The application of these techniques is a field of study per se and represents a non-trivial step that can be taken during model preparation. MOR techniques can be used in the current invention to reach a considerable reduction in computational burden leading to a feasible computational time during the estimation step of the invention. MOR techniques are not necessary for the successful implementation of the current invention but represent a way to achieve a scalable method in which accuracy and computational speed represent a tradeoff to be chosen by the modeler. In particular techniques such as (but not limited to): modal truncation, component modes synthesis, Krylov space reduction, balanced truncation, proper orthogonal decomposition, energy-conserving sampling and weighting, empirical and discrete empirical interpolation method, global modal parameterization, generalized component modes synthesis, trajectory piecewise linear model reduction, ManiMor, Proper Generalized Decomposition, parametric model order reduction techniques, hyper-reduction techniques, or any other method that is suited to reduce the computational burden imposed by numerical models by reducing the original number of degrees of freedom and/or equations. These techniques have not only the advantage of lowering the number of degrees of freedom but can show some other valuable benefits such as lowering the numerical stiffness of the problem at hand with the consequent advantages from a solver point of view (larger time-step allowed, improved stability, etc.). If a MOR technique is used, it is of paramount importance to select the proper method according to a specific problem; MOR is an art on its own and strong engineering judgment is still needed to obtain optimal computational performances without drastically compromising accuracy.

Efficient rendering could also be exploited in the current invention but it is not a compulsory step. It may be enabled by efficient rendering techniques,—as the process of obtaining Images of the photorealistic electromechanical numerical models—by the use of modern GPU architectures, with their programmable pipeline. The combination with reduced order models benefits the invention allowing fast generation of digital images of the photorealistic electromechanical numerical model. More in general, usage of massively parallel accelerators for efficiently computing the simulated field quantities, within a MOR scheme is a not trivial technical step, which boost the potential fields of industrial application of the presented invention as opposite to other methods as in e.g. in international patent application WO2014/127321 which rely on a controlled (medical) environment for their success.

The estimation of the electromechanical quantities might be enabled by one or more estimation techniques. It is an advantage of this invention to allow the usage of time domain estimators such as (but not limited to) Kalman-based filtering, moving horizon estimation and/or Luenberger observer, etc. The estimators might enable the usage of dynamic transient numerical models of the electromechanical machines and/or component which incorporates information about the full time history of the estimated quantities including videos and Images measured with a camera and/or created with the photorealistic electromechanical numerical model.

In some embodiments the estimators might allow to retrieve a stochastic error measure of the discrepancy between the physical electromechanical quantities and the estimated electromechanical quantities.

The quality of the acquired videos or photo camera images together with the estimation approach and the similarity measures might allow to reach accuracy which are one to three orders of magnitude smaller than a pixel size.

In one aspect the present invention also provides a method for estimating one or more of the following electromechanical quantities from an electromechanical machine or component:

States: including but not limited to positions, velocities, accelerations, strains, strain rates, currents;
Input: including but not limited to mechanical forces, mechanical torques, mechanical pressures, voltages;
Parameters: including but not limited to density, Young's moduli, Poisson's ratios, material parameters, physical dimensions, resistance, capacitance . . . .

the method comprising:
the creation of a photorealistic numerical model of the electromechanical machine or part of it;
a measurements step that allows to combine physical sensors of which at least one is an imaging device that allows to capture the appearance of the external surface of the physical electromechanical machine or parts of it in one or more 2D images,
an estimation step combining the photorealistic numerical model and measurement step to provide an estimate of desired electromechanical quantities,
The estimation step is primarily but not only based on the usage of a similarity metric between at least said one or more 2D images of the electromechanical machine or parts of it and the images generated thanks to the photorealistic numerical model.

In one aspect, the present invention relates to a method of sensing a physical object, the method comprising providing a photorealistic virtual object of a physical object, and performing an operational step, the operational step comprising a measurement step, the measurement step comprising recording the physical object and acquiring physical field measurements of the physical object, and an estimation step, the estimation step comprising applying external excitations to the photorealistic virtual object to create photorealistic virtual field measurements and comparing the photorealistic virtual field measurements with the physical field measurements and therefor sensing the physical object.

Comparing the photorealistic virtual field measurements with the physical field measurements may comprise matching the photorealistic virtual field measurements with the physical field measurements and retrieving the excitation resulting in said matching.

Comparing the photorealistic virtual field measurements with the physical field measurements may comprise minimizing a cost function representing a measure of similarity of the photorealistic virtual field measurements with the physical field measurements.

The external excitations may be known or estimated.

Providing a photorealistic virtual object of a physical object may comprise creating a model or virtual object of the physical object and texturizing the model with at least one image of the physical object.

Creating a model of the physical object may comprise a model creation step and a model registration step.

The model registration step may comprise positioning and orienting the physical object and the model.

The model may be a numerical model.

The model may be a two or three dimensional model.

Texturizing the model with at least one image may comprise using an image-based rendering method such that the model or virtual object of the physical object is consistent with the at least one image of the physical object.

The at least one image may be obtained while recording during the measurement step.

Wherein the at least one image may be obtained by a photo or video imaging means, magnetic based imaging means, radiographic imaging means, solid state or scanning light detection imaging means and/or thermographic imaging means.

The physical field measurements of the physical object may be obtained by measuring the physical object in static or dynamic excitation.

The physical field measurements of the physical object may be distributed and/or deformed physical fields.

The present invention also relates to a device comprising a processing system, the processing system adapted to perform the method as described above.

The present invention furthermore relates to a system for sensing a physical object, the system comprising
at least one means for measuring fields of the physical object;
a processing adapted to receive the output of the at least one means for measuring fields of the physical object and adapted to perform the method as described above.

Particular and preferred aspects of the invention are set out in the accompanying independent and dependent claims. Features from the dependent claims may be combined with features of the independent claims and with features of other dependent claims as appropriate and not merely as explicitly set out in the claims. Similarly, optional and/or standard features of the different aspects may be combined as appropriate and not merely as explicitly set out in the claims. These and other aspects of the invention will be apparent from and elucidated with reference to the embodiment(s) described hereinafter.

BRIEF DESCRIPTION OF THE DRAWINGS

FIG. 1 illustrates a method according to embodiments of the present invention.

FIG. 6 illustrate a measurement Images of the physical (electro)mechanical machine and/or component according to embodiments of the present invention.

FIGS. 7A-7D illustrate an estimation step or phase according to embodiments of the present invention.

FIG. 9 illustrates possible hardware-software systems according to embodiments of the present invention.

FIG. 10 illustrates a summary of a method according to embodiments of the present invention.

Figure 2:
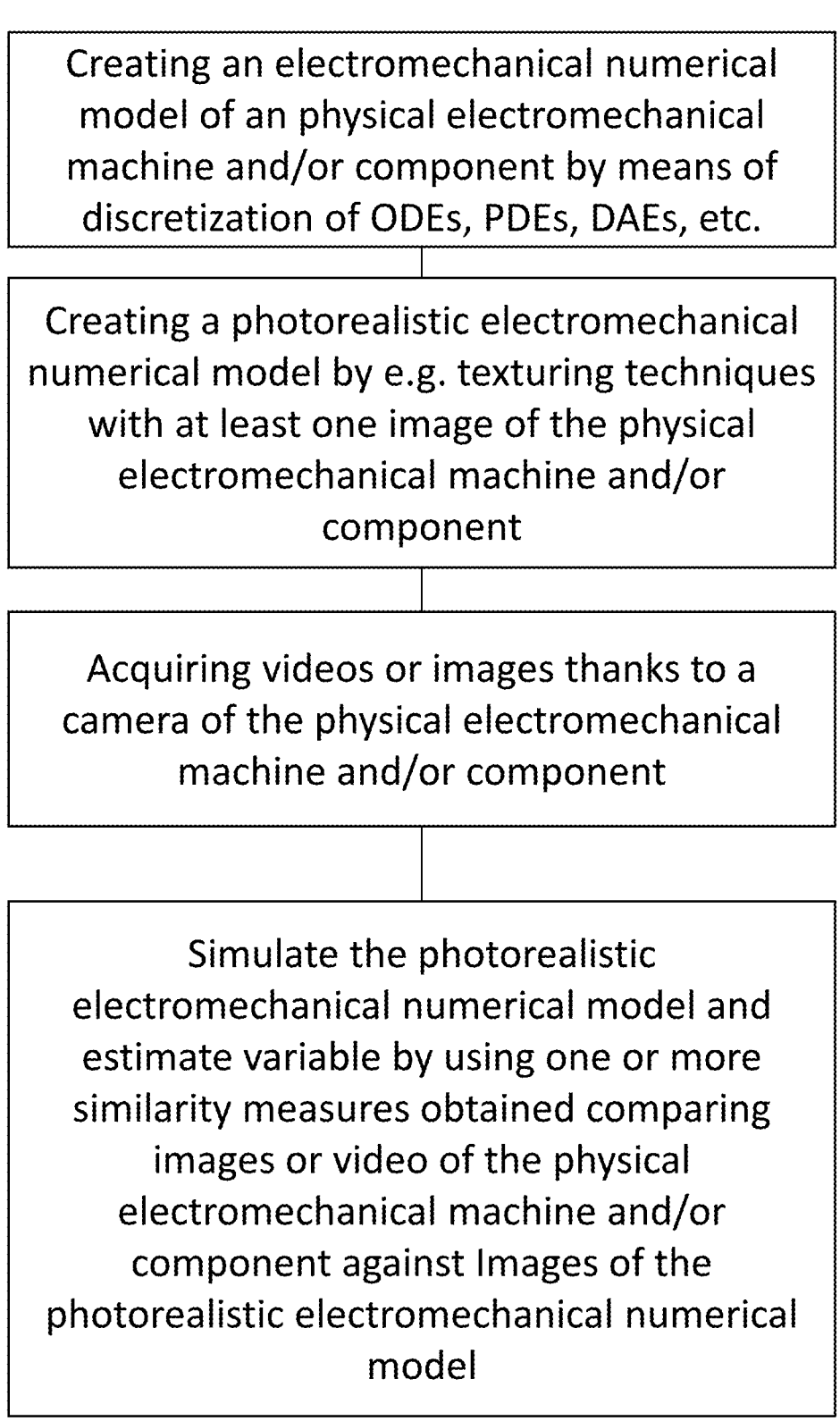
FIG. 2 illustrates a method according to embodiments of the present invention.

The drawings are only schematic and are non-limiting. In the drawings, the size of some of the elements may be exaggerated and not drawn on scale for illustrative purposes. Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, as evidenced in FIG. 1, the present invention provides methods of sensing a physical electromechanical machine and/or component, the method comprising providing a photorealistic electromechanical numerical model of the physical electromechanical machine and/or component and performing an estimation step. The estimation step comprises a measurement and estimation step, the measurement step comprising recording the physical electromechanical machine and/or component and acquiring one or more images or videos of the physical electromechanical machine and/or component and the estimation step comprising performing a time simulation of the photorealistic electromechanical numerical model to create simulated photorealistic images of the electromechanical numerical model and comparing the simulated images and/or videos with the images and/or videos of the physical electromechanical machine and therefore "sensing" the physical electromechanical machine and/or component within an estimation algorithm. In further embodiments, as evidenced in FIG. 2, providing a photorealistic electromechanical numerical model of the physical electromechanical machine and/or component may be enabled in a calibration step, by creating a numerical model of the physical electromechanical machine and/or component and texturing the numerical model with at least one image of the physical electromechanical machine and/or component. As a result, embodiments of the present invention describe a workflow and methodology to augment numerical models of physical systems and/or objects. More specifically, to augment numerical models with field measurements, e.g. images and/or videos of the physical electromechanical machine and/or component. This augmentation may be obtained by texturing the numerical model by using images and/or videos of the physical electromechanical machine and/or component.

The images or videos of the physical electromechanical machine and/or component may be obtained from any acquisition hardware dedicated to capturing images e.g. digital photo/video cameras. According to embodiments of the present invention, the images or videos are 2 dimensional images or videos.

In embodiments of the present invention the photorealistic electromechanical numerical model is created such that (parts of) it closely resemble the appearance the electromechanical machine and/or component which is imaged thanks to the acquisition hardware (e.g. photo and video cameras) and software. This resemblance is referred to as "photoconsistency". The created photorealistic electromechanical numerical model allows its photorealistic visualization under different conditions (e.g. rest, motion, deformed state, temperature) to be subsequently used to obtain images and/or videos of such photorealistic electromechanical numerical model.

The photorealistic electromechanical numerical model might be augmented with a visualization of (parts of) the electromechanical estimated quantities which are of interest to the user of embodiments of the present invention.

In current state-of-the-art estimation approaches the data obtained from field sensors is transformed into variables which can be found directly in the virtual object (e.g. camera images are transformed into the motion of a limited number of points which can then be compared to the motion of the same points in a mechanical model). However, in embodiments of the present invention the photorealistic electromechanical numerical model is created such as to visually behave as the physical electromechanical machine and/or component. As such, the images of the photorealistic electromechanical numerical model can be directly compared with the images of the electromechanical machine and/or component e.g. in its working environment.

The comparison can be based on methods pertaining to the field of digital image correlation (DIC), comparing pixel intensities, by means of motion estimation, thanks to feature extraction or any other suitable means. Estimation techniques can subsequently be applied by means of e.g. Kalman filter, Moving Horizon Estimation (MHE) or Luenberger observers. This step is preferred to achieve estimates of unknown electromechanical quantities such as "distributed fields" (e.g. displacements, velocities, stresses, strains, accelerations, temperatures, etc.), "localized measurements" (e.g. displacements, velocities, mechanical and thermal stresses/strains, accelerations, temperatures, etc.), "system states", unknown input or internal loads or any type of "input" (e.g. forces, torques, thermal sources, voltage, etc.) and/or "parameters" (geometrical dimensions, stiffness, mass, density, material properties, etc.)—possibly varying in time. Distributed fields, unknown excitations, localized measurements system states and parameters are further and previously referred as to estimated electromechanical quantities.

The achievement of accurate estimates of variables as defined above is linked to one or more of several steps.

Embodiments of the present invention provide a numerical/experimental process comprising one or more of the following steps or aspects: a preparation step and an estimation step. Whereby the preparation step may comprise a model definition and creation step and a photorealistic "augmentation" of the electromechanical numerical model. The estimation step may comprise a measurement phase and an estimation phase, and more specifically a photorealistic-model-based estimation.

As indicated in general a method according to embodiments of the present invention may be split in two main phases. A preparation phase may comprise the following: steps in which the electromechanical numerical model is prepared, registered and converted into a photorealistic electromechanical numerical model according to embodiments of the present invention. However, other alternative techniques known in the art, that lead to the same result as the preparation phase like e.g. a photorealistic electromechanical numerical model, can also be used directly as an input to the estimation phase when available by other means. According to some embodiments of the present invention the computational load of simulation of the photorealistic electromechanical numerical model is reduced through model order reduction techniques.

The estimation phase according to embodiments comprises a measurement phase in which digital images or videos of the electromechanical machine and/or component are acquired together with time series of other optional sensors and a proper estimation phase in which the values of the desired variables are evaluated. The estimation phase advantageously uses a photorealistic electromechanical numerical model in the context of estimation. The images or videos according to embodiments of the present invention comprise 2 dimensional images or videos.

In embodiments of the present invention a preparation phase or step may be provided. Said calibration phase or step may comprise (1) a model definition step, (2) a model registration step and (3) a photorealistic model creation.

Figure 3A:
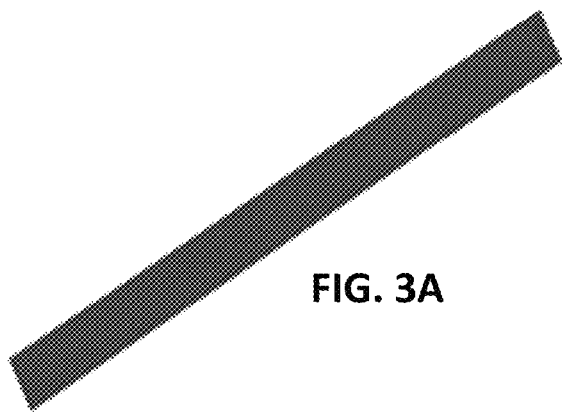
FIGS. 3A-3C illustrate creating a model according to embodiments of the present invention.
Figure 3B:
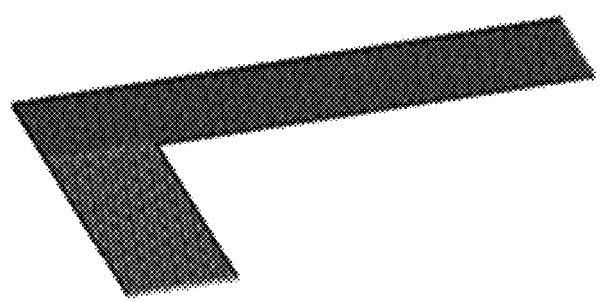
Figure 3C:
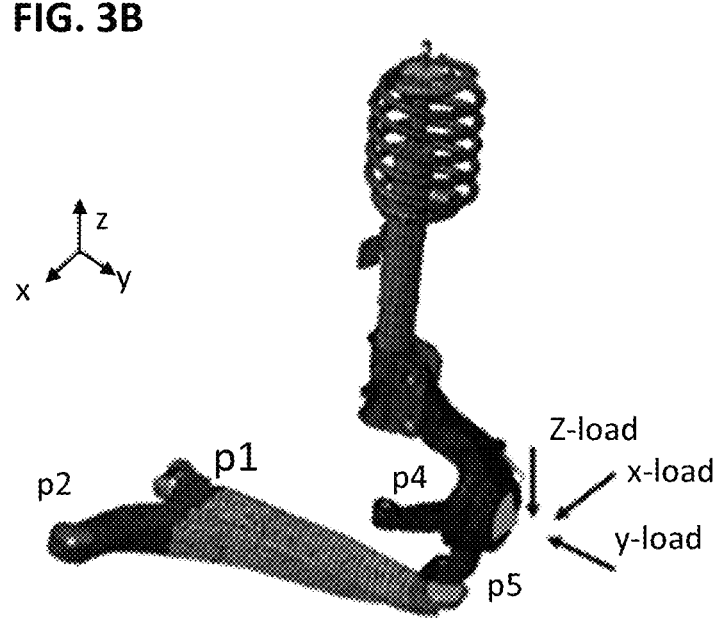

A model creation step according to embodiments of the present invention may comprise a creation step, whereby a numerical method is used to create a numerical representation of a physical electromechanical machine and/or component which variables are to be estimated. In particular methods that allow a 2D or 3D representation of the physical electromechanical machine and/or component (e.g. a realistic visualization or photoconsistency) are used. FIGS. 3A-3C illustrate definition and creation of a model according to embodiments of the present invention. As a first step the geometry of the model is created, like e.g. by point cloud, CAD, etc. Then the discretization of the model is performed, like e.g. finite element model (FEM), a flexible multibody model etc.

As an illustration FIGS. 3A and 3B illustrate structural FEMs of an (electro)mechanical component, e.g. simple beam structures. More specifically, FIG. 3A illustrates a top view of an FEM model of a beam, whereas FIG. 3B illustrates an FEM model of an L-shaped beam. FIG. 3C illustrates a detailed flexible multibody model of a vehicle suspension. In embodiments the full or partial shape reconstruction of the electromechanical machine and/or component is reflected in the model. It is preferred, the invention not limited thereto, that the chosen method is capable of representing distributed variables such as positions, accelerations, velocities, mechanical and thermal strains, stresses, temperatures, etc. Numerical models and modelling methods can be but are not limited to: (a) (linear and non-linear) finite elements, finite volumes, finite differences, multibody and flexible multibody models, isogeometric models, etc.; (2) a possible choice are modelling methods that allow to discretize systems of algebraic, ordinary differential, partial differential and differential algebraic equations; and (3) a further choice of modelling methods that allow a continuous representation of the electromechanical machine and/or component are also possible.

Typical examples are structural and thermal finite element models of mechanical components and flexible multibody systems of mechanisms as found in all machineries, vehicles, energy production, electromechanical models, etc. These 3D models can be based on CAD design drawings or from 3D scans of the electromechanical machine and/or component. Generally speaking 2D and 3D numerical models that are capable of representing distributed fields are computationally expensive. In this case techniques such as linear and nonlinear Model Order Reduction ("MOR") are the preferred choice to gain in computational speed with minor accuracy losses.

Several research and commercial tools are available to perform the model definition and creation. Ideally the electromechanical numerical model should be carefully updated to fit the behavior of the physical electromechanical machine and/or component with respect to e.g. static and dynamic characteristics or any other characteristic and behavior of interest.

After creating the photorealistic electromechanical numerical model, in a next step according to embodiments of the present invention, a model registration might be performed. Model registration may comprise at least one of the following steps: a shape reconstruction step, updating the geometry of the model and positioning and changing the orientation of the virtual and electromechanical machine and/or component as according to one of several methods known in the art.

Different methods can be used in order to increase the accuracy of the comparison between the images of the physical electromechanical machine and/or component and the images of the photorealistic electromechanical numerical model by adding more "granularity" or "contrast" to the physical electromechanical machine and/or component. The methods can be (but are not limited to): application of markers or high contrast patterns by means of e.g. spray paint, stickers or any means that can be used to accurately track its geometry. This last step is not necessary and the physical electromechanical machine and/or component (surface) natural features can be used when accuracy allows for it.

In further embodiments of the present invention the step of the model registration may comprise modifying the geometry, location, orientation in space of the virtual object in order to closely match the same (geometrical) characteristics of the electromechanical machine and/or component with respect to a common chosen reference frame. This step can be achieved by optimization routines that allow an accurate alignment and positioning in space. In particular two or more points in a reference configuration can be used to create a direct correspondence between the numerical model geometry and the physical system/component geometry in space. These points are called control points and are used to orient the numerical model as accurately as possible and align it to the physical system/component. The latter approach is only one possibility that can be used and the general framework is not restricted to this. Any method that allows a proper alignment and geometrical correspondence between the numerical model geometry and the physical system/component can be used.

Figure 4A:
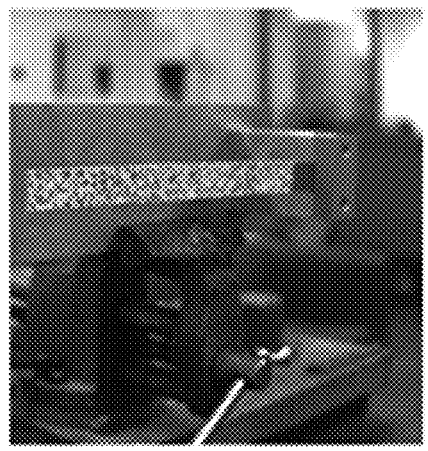
FIGS. 4A-4C illustrate a model registration step according to embodiments of the present invention.
Figure 4B:
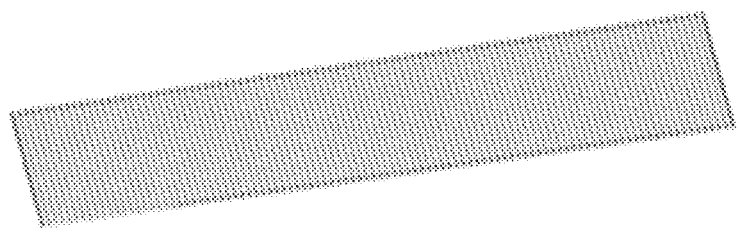
Figure 4C:
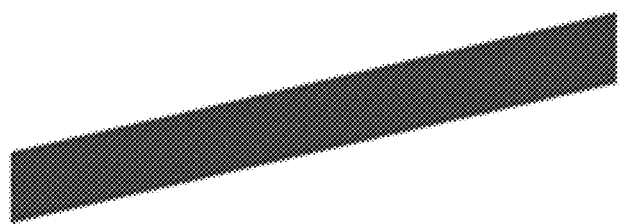

FIGS. 4A-C illustrate the model registration according to embodiments of the present invention, wherein FIG. 4A illustrates an image of an (electro)mechanical machine and/or component which is clamped and more specifically a cantilever beam enhanced with a speckle pattern. FIG. 4B illustrates the model reconstruction and more specifically the (electro)mechanical machine and/or component points cloud reconstructions. The result of a 3D shape reconstruction is provided in which a cloud of points is obtained. Finally, FIG. 4C illustrates an updated finite element (FE) model of the cantilever beam, where the numerical model is updated and its orientation changed such that it is an oriented FE model and positioned similar to the physical (electro)mechanical machine and/or component. More specifically, the surface of the numerical FE model matches the point cloud and is oriented as the object provided in FIG. 4A. To enable the above, motion tracking image acquisition software may be used: e.g. image and video acquisition, blob tracking, features detection, etc.

At least one field measurement device may be used, whereby these devices could be, but are not limited to (In this invention, the usage of photo and video cameras in preferred but other means might still be used in the framework of this invention, these other means might increase or decrease the price of the setup, restrict or extend its industrial applicability and increase of reduce its accuracy): (a) photo or video cameras, wherein the quality of the images is preferably relatively high and noise free, in addition static images can be used, averaging of multiple images can improve the usage of low cost cameras, and depending on the desired accuracy, cameras can range from low fidelity medias such as webcams to high-fidelity and high-speed megapixel cameras. According to embodiments of the present invention, at least 2D image or videos are used. Images and videos can be acquired both in grey-scale and/or in color (e.g. 8 bits and above), (b) a magnetic imaging means, like e.g. an MRI scanner, where these scanners perform imaging based on the magnetic response of the object under survey. These scanners are often combined with tomography methods in order to construct full 3D information. This last step is however not necessary for the estimation purposes discussed in this work; (c) a radiographic imaging means like e.g. X Ray imaging, whereby these devices perform field imaging of an object based on radiographic principles and is particularly suitable to obtain information inside an object; (d) a solid state or scanning light detection and ranging devices, like e.g. LiDar, which provide a field of information of the distance of a large number of points with respect to the sensor, and (e) thermographic imaging means or cameras, which, by capturing light in the infra-red range (rather than the visible range as photo camera), can be used to detect temperatures and can also be used in the absence of light sources.

In further embodiments the transfer of data from the camera to the target PC can be performed with any type of protocol depending on the speed and amount of data to be transferred e.g. CameraLink, USB3, GiGe, CoaXPress, etc. This data transfer can happen in real-time, online or offline depending on the application. In further embodiments frame grabbers may be used: given the potentially large amount of data acquired, a frame grabber might be needed to allow a fast enough connection between the cameras and a storing media such as a RAM memory, a hard disk or an SSD or any type of memory that can be used for this purpose;

In further embodiments of the present invention the preparation step may further comprise creating and visualizing a photorealistic electromechanical numerical model. The procedure allows to create a rendered image of the numerical model such that the virtual measurement field closely matches/resembles (part of) the measured field on the electromechanical machine and/or component—or in other words the numerical model becomes photoconsistent. The resulting created model may be referred to as a "photorealistic electromechanical numerical model". This aspect can be performed by any image-based rendering procedure (e.g. view dependent texture mapping) or any procedure that allows to reach the same result.

For example, the images of the physical electromechanical machine and/or component stored in any previous steps may be used and each part of the reconstructed surface of the photorealistic electromechanical numerical model (e.g. composed of triangles and quadrilateral) is assigned a specific texture by combining all or part of the images that visually cover that specific surface patch. The combination can be obtained for example by applying interpolation techniques. The interpolation can be performed for example by selecting weights proportional to a metric of the distance between the selected surface and the camera's. Other methods to combine textures or interpolate textures can be applied. The interpolation might respect the partition of unity rule. Finally a photorealistic electromechanical numerical model is created such that it can be visualized from one or more different points of view and configurations and it visually resembles the electromechanical machine and/or component: in one word it is photoconsistent with the physical electromechanical machine and/or component. Photoconsistent images of the electromechanical numerical model or virtual object can be obtained with techniques such as render-to-texture or any other technique that allow storage of images reproduced on screens or devices in general. The photorealistic electromechanical numerical model creation step may be performed by any available technique in the state-of-the-art, in the field of image-based modelling and rendering.

Figure 5A:
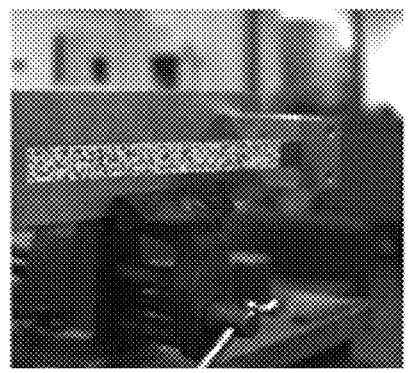
FIGS. 5A-5C illustrate creating a photorealistic (electro) mechanical numerical model according to embodiments of the present invention.
Figure 5B:
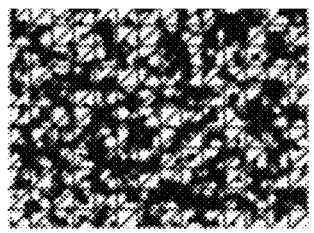
Figure 5C:
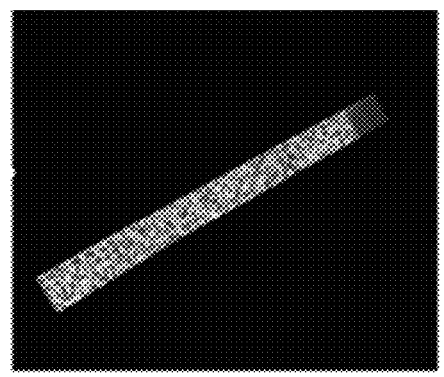

FIGS. 5A-5C illustrate the photorealistic electromechanical numerical model or virtual object creation step according to embodiments of the present invention. By image-based modelling and rendering (e.g. by view dependent texture mapping) a photorealistic electromechanical numerical model or virtual object is created. FIG. 5A illustrates an image of a physical electromechanical machine and/or component, e.g. a clamped beam, wherein the physical electromechanical machine and/or component is enhanced with a speckle pattern. This image is then used to create a texturized virtual object. FIG. 5B illustrates a zoomed part of the FE model surface (which comprises triangles) in which the beam is discretized and overlays with the speckle patterns provided by the image (the speckled beam in the image of FIG. 5A). In FIG. 5B texture is assigned to the FE mesh triangles. Finally, FIG. 5C illustrates a photorealistic electromechanical numerical model or virtual object according to embodiments of the present invention, more specifically this figure illustrates a rendered FE model of the beam that closely resembles or is photoconsistent the physical electromechanical machine and/or component depicted in FIG. 5A. Embodiments of the present invention comprise an operational step, wherein the operational step comprises a measurement and estimation step. In preferred embodiments the measurement phase or step comprises recording the physical electromechanical machine and/or component through a single or a series of videos, snapshots or images. These can be, but are not limited to, (a) the physical electromechanical machine and/or component at rest in its physical environment; (b) the physical electromechanical machine and/or component subject to any type of internal or external excitation being it static, steady state, transient, etc. The physical electromechanical machine and/or component can be positioned in a test-rig and might be subject to internal or external excitation (including a zero excitation) that lead to "deformed distributed fields". These can be different from the (deformed or undeformed) distributed fields captured at in points (a) and (b). In preferred embodiments the physical electromechanical machine and/or component subject to any type of internal or external excitation being it static, steady state, transient, etc. The physical electromechanical machine and/or component can be positioned in its working environment and might be subject to internal or external excitation (including a zero excitation) that lead to "deformed distributed fields". These can be different from the (deformed or undeformed) distributed fields captured at point (a) and (b).

In preferred embodiments any situation in which distributed or deformed distributed fields are created and are suitable for recording and/or images can be taken (e.g. the physical electromechanical machine and/or component is visible).

Following one of the mentioned scenarios a series of video recording or images (one or more) are captured.

Potential hardware and/or software which can be used to enable the measurement step may be the following:

Motion tracking and image acquisition software: e.g. image and video acquisition, blob tracking, features detection, etc. These can be both research and commercial codes.

Photo or video cameras: Depending on the desired accuracy cameras can range from low fidelity medias, such as webcams, to high-fidelity and high-speed megapixel cameras. Images and videos can be acquired both in grey-scale and in color.

Sensor acquisition system: in the measurement phase other measurements beside visual measurements can be acquired to complement visual measurements e.g. accelerations, velocities, positions, strains, temperatures, etc. Dedicated data acquisition systems (DAQs) can be used for this purpose following standard measurements procedures.

The transfer of data from the camera to the target PC can be performed with any type of protocol depending on the speed and amount of data to be transferred e.g. Cameralink, USB3, GiGe, CoaXPress, etc.

Frame grabbers: given the potentially large amount of data acquired a frame grabber might be needed to allow a fast enough connection between the cameras and a storing media such as a RAM memory, a hard disk or an SSD or any type of memory that can be used for this purpose;

The images provided collectively as FIG. 6 illustrate several examples of physical field measurements (images) of the cantilever beam that are acquired under different loaded conditions (e.g. external (static) excitation) and views.

In embodiments of the present invention the method comprises an estimation step, more specifically a photorealistic electromechanical numerical model-based estimation. In further embodiments a photorealistic electromechanical numerical model is used to create photoconsistent images or videos or snapshots resulting in "photorealistic field measurements" or images of the photoconsistent electromechanical numerical model. In practice distributed or deformed distributed fields will cause a variation (locally and or globally) of the distributed field measurements (or photorealistic virtual measurements—e.g. images of the photoconsistent electromechanical numerical model), e.g. (but not limited to) pixels intensities, which leads to differences between the images of the physical electromechanical machine and/or component and the images of the photorealistic electromechanical numerical model. The images of the photorealistic electromechanical numerical model can be compared by different means with the images of the physical electromechanical machine and/or component. If these images present a mismatch, the photorealistic electromechanical numerical model can be updated or modified by one of the techniques described below (or any other technique that reaches the same goal) until the mismatch is minimized in some sense. The updating can be achieved by varying or perturbing the excitation, parameters or system states of the photorealistic electromechanical numerical model. In more simple terms, when the mismatch between the images of the photorealistic electromechanical numerical model and the images of the physical electromechanical machine and/or component is completely removed or minimized, then the virtual object's excitation, parameters or states will approach the physical electromechanical machine and/or component's excitation, parameter or states and provide an estimation of the above. Preferably but not necessarily the matching approach uses an optimal tradeoff between the uncertainty of the virtual field measurement on the numerical model and the uncertainty of the field measurement on the physical electromechanical machine and/or components, this can be achieved by techniques related to e.g. Kalman-based filter and/or Moving Horizon estimators.

In particular, during the updating, distributed fields or deformed distributed fields are created by exciting the photorealistic electromechanical numerical model resulting in photoconsistent videos or images in a similar fashion as for the physical electromechanical machine and/or component. The images obtained from the photorealistic electromechanical numerical model are exploited to infer information about the physical electromechanical machine and/or component. Embodiments of the present invention advantageously overcomes existing procedures known in the art by allowing this step in a time efficient and accurate way by using images of distributed and deformed distributed fields including primarily variations of distributed field measurement e.g. (but not limited to) pixel intensities. The usage of field measurements devices (e.g. photo and video cameras) is advantageously less invasive than the mounting of popular discrete sensors like force cells, accelerometers, strain gages, etc. Moreover, embodiment of the present invention advantageously allow to use (2D) images captured by a potentially single field sensor to infer information on the full 3D fields of interest. This is a clear differentiator with respect to any other technique available and solves issues related to cost, calibration, ease of use and portability allowing a much larger productivity.

In embodiments of the present invention the estimation (during the estimation step) can take place in an on-line or off-line fashion. On-line here means that the estimation is performed as a parallel task, but not necessarily synchronized with the image acquisition as a recursive not stopping process as long as the physical electromechanical machine and/or component is under analysis. Off-line here refers to the fact that a limited set of images can be stored, and potentially be ported to another physical location at later stages in time, for further estimation processing. In this case the estimation procedure becomes a post-processing step.

The following are typically foreseen (but not limiting) applications of the method according to embodiments of the present invention:

Model Updating: In this application some specific tests are performed on the physical electromechanical machine and/or component and images are captured from one or multiple views and or sensors. During test a (potentially un-) known excitation causes the physical electromechanical machine and/or component to vary its physical state with respect to the reference state used e.g. for the model calibration and creates distributed fields or deformed distributed fields that in turn will result in variations of the captured physical field measurements (or images/videos). As an example one can think of mechanical components that undergo motion and/or deformation. These motions and deformations will cause a (potentially null) variation of the pixel intensities of the captured images with respect to any other reference configuration. The photorealistic electromechanical numerical model can be excited with the same known excitation that has been applied to the physical electromechanical machine and/or component in order to create approximations of the distributed or deformed distributed fields undergone by the physical electromechanical machine and/or component. Photorealistic field measurements are simulated on the numerical model (e.g. images of the photorealistic electromechanical numerical model). If the photorealistic field measurements from the numerical model and the physical field measurements are not matching to a desired level of accuracy, the parameters of the photorealistic numerical model can then be updated until matching is achieved. The matching can be obtained thanks to (but not only) a combination of optimization techniques, DIC techniques, features extraction, etc. In one embodiment the pixel intensities are used to create a correlation or similarity metric that is used as objective function to be minimized by means of any suitable optimization strategy. As a matter of example, a physical electromechanical machine and/or component that undergoes motion and/or deformation is considered. The photorealistic electromechanical numerical model is deformed and the applied texture resembling the appearance of the physical electromechanical machine and/or component deforms with it. Photorealistic field measurements on the numerical model can then be simulated thanks to known techniques such as render-to-texture. Calculations can be performed both on e.g. a CPU or a CPU. The parameters of the photorealistic electromechanical numerical model can be updated until the matching between photorealistic field measurements on the numerical model and physical field measurements is satisfactory (e.g. present a pixel intensity distribution as similar as possible between each other meaning that the images of the photorealistic electromechanical numerical model are similar to the images of the physical electromechanical machine and/or component). A satisfactory matching can be achieved by e.g. updating parameters. These can be but are not limited to material parameters, connection stiffness, damping, etc. DIC techniques allow to track pixel intensity variations with an accuracy at subpixel level such that motion or deformation that is usually not visible to the human eye can be potentially detected. Possible application cases are (but not limited to): (a) updating kinematic characteristics of (industrial) mechanism (e.g. robot manipulators, industrial machines involved in series production and automation—as for example weaving machines, laser cutters, automotive production chains, etc.), suspension systems, etc.; (b) Updating material parameters of components in their operational environment (e.g. cranes, buildings, vehicles, vehicle components, robot manipulators, industrial machines involved in series production and automation, wind turbines, etc.)

Inputs-states-parameters estimation: A particularly active field of research deals with the estimation of input, states and parameters of the mechatronic, mechanical and in general multiphysical systems. In particular the field of Kalman based filtering and Moving Horizon Estimation (MHE) are often used as framework to combine localized measurements taken from e.g. position, velocities, accelerations, strains, temperatures, etc. If an updated photorealistic electromechanical numerical model is available, several field measurements of the physical electromechanical machine and/or component can be captured during real operational conditions or under testing on e.g. a dedicated test-rig. Excitations can be applied to the photorealistic electromechanical numerical model until the virtual field measurements (e.g. images and/or videos) on the numerical model closely matches the images and/or videos on the physical electromechanical machine and/or component. In particular the photorealistic electromechanical numerical model is deformed and the applied texture will deform with it, images can then be simulated thanks to known techniques such as render-to-texture performed on e.g. a CPU or a GPU.

In one embodiment the applied static excitations are known and one is interested in estimation of states of the physical electromechanical machine and/or component and/or the estimation of the time evolution of parameters of the physical electromechanical machine and/or component. This can be obtained with the aid of any available local or global optimization strategy suited for the purpose (e.g. non-linear least square optimizers, Leuvenberq Marquardt, interior point, genetic or evolutionary strategy, etc.). As a secondary but relevant bi-product of the estimation, the photorealistic electromechanical numerical model allows to retrieve accurate estimated 2D and/or 3D deformed distributed fields of the object. In a second embodiment the applied dynamic excitations are known and one is interested in estimation of states of the physical electromechanical machine and/or component and/or the estimation of the time evolution of parameters of the physical electromechanical machine and/or component. This can be obtained with the aid of one (but not limited to) of the following techniques: (1) by using a (linear or non-linear) Kalman-based approach in which images are included as measurements and the photorealistic field measurements represents the measurements equations. The photorealistic field measurements on the numerical model can potentially be combined with one or more types of alternative sensors such as e.g. accelerometers, position sensors, strain gages, etc. Kalman-based techniques include (but are not limited to) linear Kalman filter/smoothers/predictors, non-linear extended or sigma-point Kalman filter, minimum variance filters, etc.; (2) by using a (linear or non-linear) Kalman-based approach in which one or more sensors such as e.g. accelerometers, position sensors, strain gages, etc. are used as in a traditional setting. After the estimated states/parameters are updated, the visual measurements may be used to obtain an improved matching of the photorealistic field measurements with the physical field measurements. This two-step approach can be performed iteratively until the Kalman prediction and the visual measurements (e.g. images and/or videos) matching is concurrently achieved (see point 1 for a non-exhaustive list of Kalman-based techniques); (3) Moving Horizon estimation (MHE) based techniques in which photorealistic field measurements are used as measurements equations; and/or (4) Any other method (e.g. optimization based or filter-based) that allows to combine measurements and numerical models to obtain improved estimated of states and/or parameters (e.g. gradient based filters, non-gradient based filters, particle filters and stochastic methods).

As a secondary but relevant bi-product of the estimation, the photorealistic electromechanical numerical model allows to retrieve accurate estimated deformed distributed fields such as e.g. position and strain fields.

In a third embodiment the applied excitations are not known and one is interested in estimation of the excitations themselves and potentially of states and parameters of the object under analysis. This can be obtained by one (but not limited to) of the following techniques: (1) By using a (linear or non-linear) Kalman-based approach in which images are included as measurements and the photorealistic field measurements on the numerical model represents the measurements equations. The visual field measurements can potentially be combined with one or more type of alternative sensors such as e.g. accelerometers, position sensors, strain gages, etc. Kalman-based techniques include (but are not limited to) linear Kalman filter/smoothers/predictors, non-linear extended or sigma-point Kalman filter, minimum ariance filters, etc.; (2) By using a (linear or non-linear) Kalman-based approach in which one or more sensors such as e.g. accelerometers, position sensors, strain gages, etc are used as in a traditional setting. After the estimated states/parameters are updated, the visual measurements can be used to obtain an improved matching of the photorealistic field measurements on the numerical model with the visual field measurements on the physical object. This two-step approach can be performed iteratively until the Kalman prediction and the visual measurements matching is concurrently achieved (see previous point for a non-exhaustive list of Kalman-based techniques); (3) Moving Horizon estimation (MHE) based techniques in which photorealistic field measurements on the numerical model are used as measurements equations; (4) Any other method (e.g. optimization based or filter-based) that allows to combine measurements and numerical models to obtain improved estimated of excitations and/or states and/or parameters (e.g. gradient based filters, non-gradient based filters, particle filters and stochastic methods). As a secondary but relevant bi-product of the estimation, the photorealistic electromechanical numerical model allows to retrieve accurate estimated deformed distributed fields.

Potential hardware and software which can be used in the estimation phase can be the following:

Modelling environment: Research or commercial software can be used to perform static and dynamic simulations (e.g. finite elements, finite volumes, finite differences software, (flexible) multibody software)

Image/field matching software: Image matching can be performed with ad-hoc dedicated software (research or commercial if available) that allows to perform any or some form of image correlation and matching (e.g. a software that is used to perform image matching between the photorealistic model and the physical system/component by using pixel intensities on single pixels or subsets of pixels, DIC software, etc.).

Optimization and estimation software: State-input and parameter estimation can be performed thanks to (adaptation of) Kalman filters based libraries, MHE based libraries, Luenberger observers libraries and optimization algorithms such as but non-limited to interior points methods, Levenberg-Marquardt, linear and non-linear least squares, etc.). These can be both research and commercial codes.

Figure 7C:
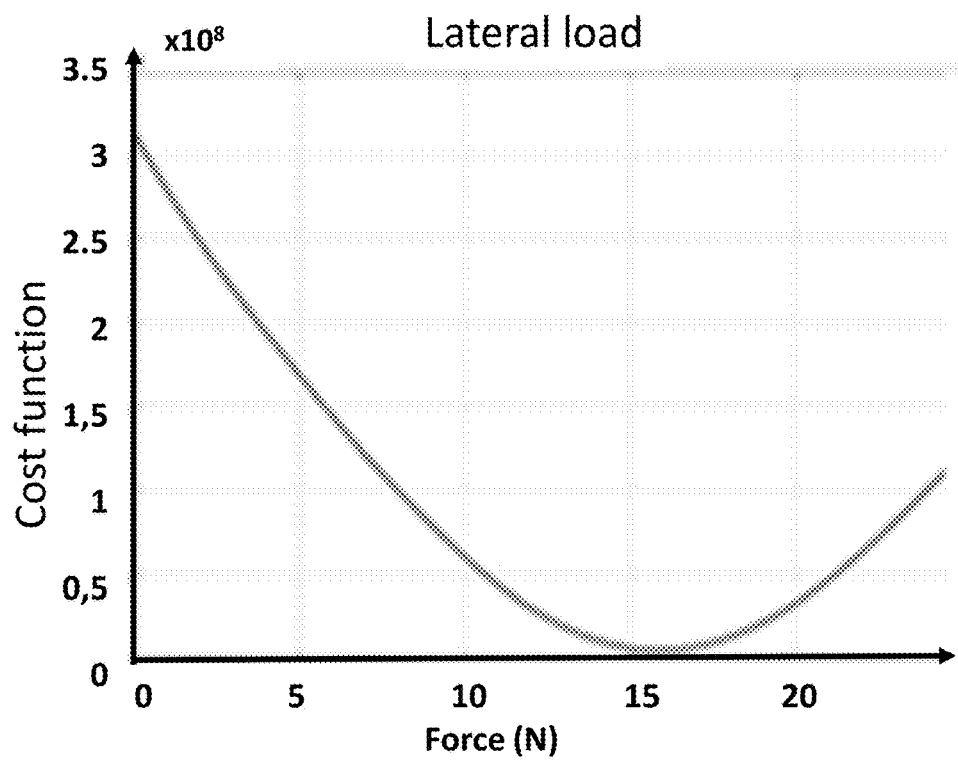
Figure 7D:
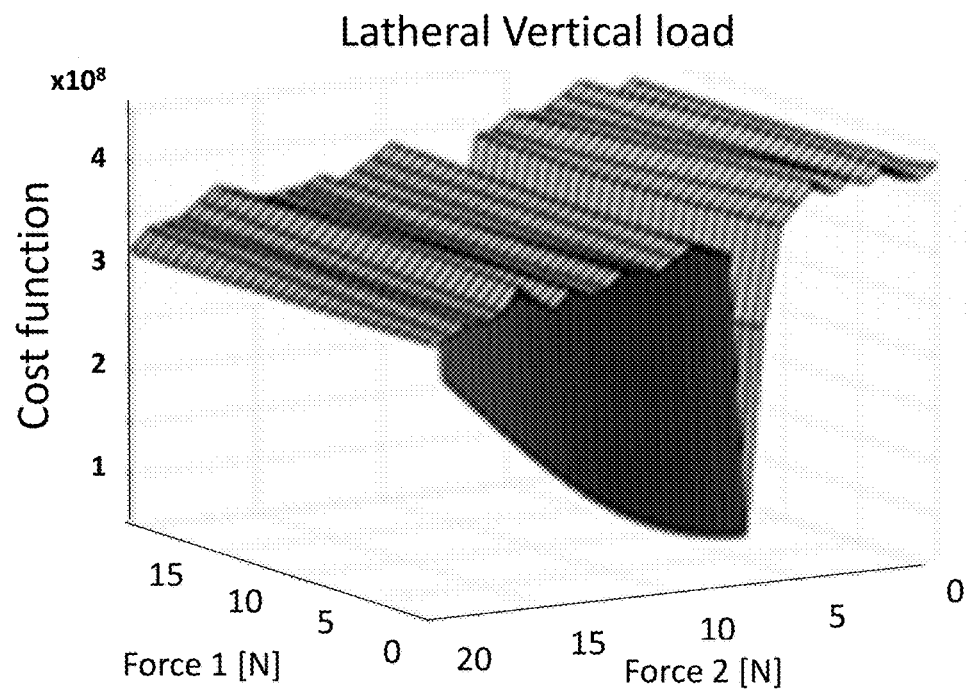
Figure 8:
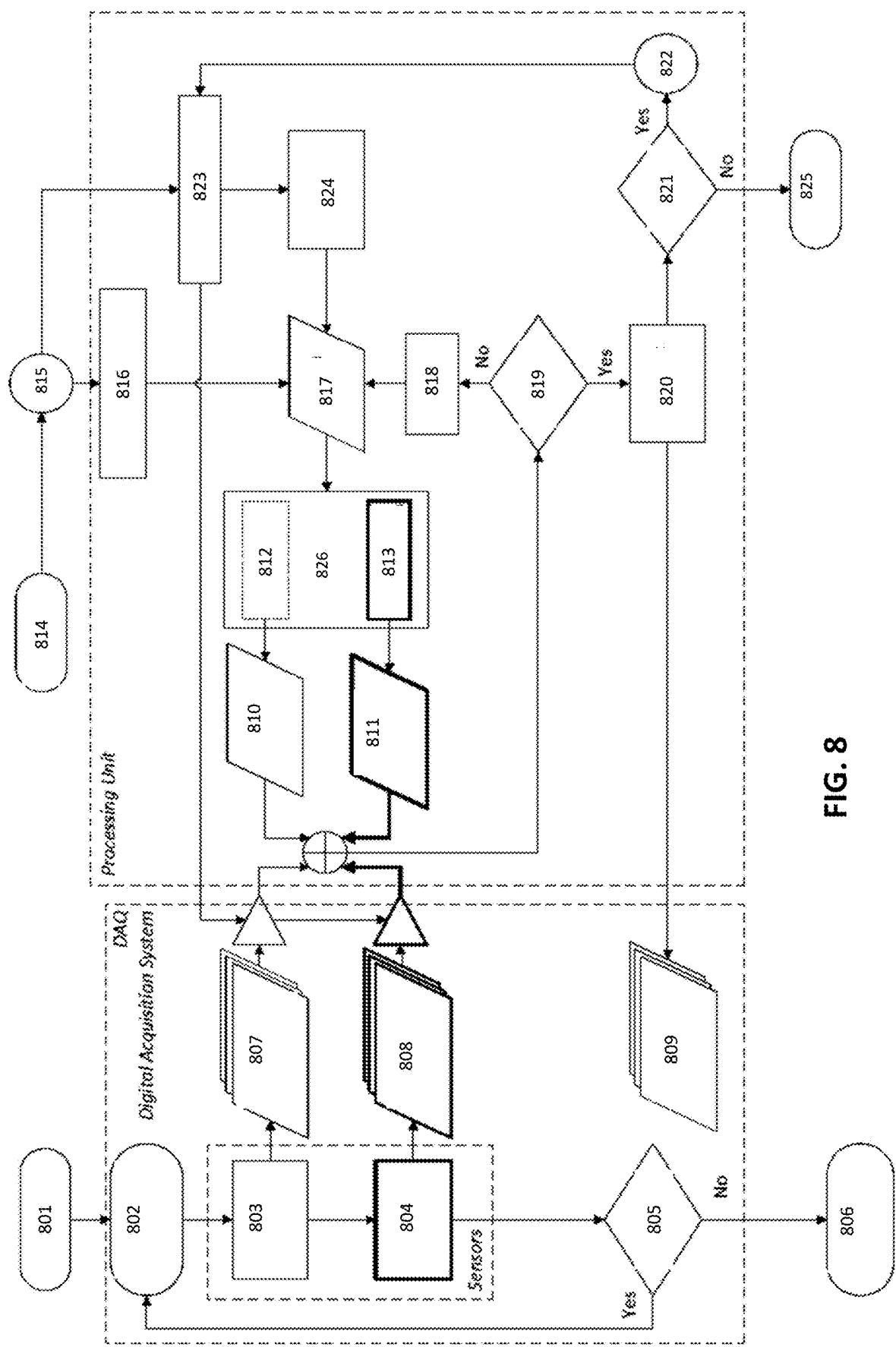
FIG. 8 illustrates a possible working flow of a method according to specific embodiments of the present invention.

FIGS. 7A-7D summarize the estimation step according to embodiments of the present invention. FIG. 7A illustrates a photorealistic image realized by applying external excitations to the photorealistic electromechanical numerical model (photorealistic beam). More specifically, it provides evidence of a deformed photorealistic field measurement on the numerical model used in embodiments of the present invention. FIG. 7B provides three images that represent the subtraction between the physical field measurement (image of the physical beam) and the photorealistic field measurement on the numerical model (image created using the photorealistic beam model). Each figure represents a different excitation applied to the photorealistic electromechanical numerical model. It is clear that the rightmost figure shows a higher degree of similarity (being it mostly black, which shows that the difference between the two images is small). The physical field measurement and photorealistic field measurement matching is illustrated here, as the right side figure shows better similarity as compared to the first two, which is an indication that excitation is well captured. FIG. 7C shows a graph in which the horizontal axis represent the load applied to the photorealistic electromechanical numerical model and a cost function representing a measure of the similarity between the physical field measurements (physical image) and the photorealistic field measurement (obtained from the photorealistic electromechanical numerical model). The cost function (image matching similarity measure) versus a single external excitation is thus provided. A minimum is clearly found around the location of the exact load that was applied to the physical cantilever beam. FIG. 7D shows a graph in which the horizontal plane represent the amplitude of the two external loads applied to the photorealistic electromechanical numerical model and a cost function representing a measure of the similarity between the physical field measurements (physical image) and the photorealistic field measurement on the numerical (obtained from the photorealistic electromechanical numerical model). The cost function (image matching similarity measure) versus multiple external excitation is thus provided. A minimum is clearly found around the location of the exact load that was applied to the physical cantilever beam. One direction is clearly more "stiff" than the other since the minimum exists but is less pronounced. FIG. 8 illustrates a detailed representation of a working flow in which the operational phase, comprising a measurement and estimation step are depicted and combined. The different steps/features are shown in the table below. The left part of the graph illustrates the measurement phase which can be started before or concurrently with respect to the estimation phase (provided on the right part of the graph). The flowchart shows a potential combination with more standard estimation workflows including discrete sensors. The boxes highlighted in bolt underline the novel parts proposed in embodiments of the present invention. FIG. 9 shows a hardware-software system according to embodiments of the present invention which can be used to implement embodiments of a method according to the present invention. FIG. 10 illustrates a summary of the method according to embodiments of the present invention. The foregoing description details certain embodiments of the present invention. It will be appreciated, however, that no matter how detailed the foregoing appears in text, the present invention may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the invention.

| 801 | Start measuring | 813 | Photorealistic field measurements |
| 802 | Trigger new sample recording | 814 | Start estimation |
| 803 | Read and store discrete sensors | 815 | T = 0 |
| 804 | Read and store field sensors | 816 | Initialize estimated quantities |
| 805 | Keep measuring | 817 | Estimated variables |
| 806 | End measuring | 818 | Correction |
| 807 | Discrete quantities acc, vel, pos, strain, temperature, etc. | 819 | Convergence ? |
| 808 | Physical field measurements | 820 | Store current estimation |
| 809 | Estimated variables | 821 | T < Tfin |
| 810 | Simulated discrete quantities | 822 | T = T + 1 |
| 811 | Simulated distributed fields | 823 | Extract sampled measures |
| 812 | Discrete quantities behavior | 824 | Predict sampled measure |
| 825 | End estimation | 826 | model |

The invention claimed is:

1. A method of sensing a physical object, the method comprising:
providing a photorealistic virtual object of the physical object;
performing a measurement step, the measurement step comprising recording the physical object and acquiring physical field measurements of the physical object comprising at least one 2 dimensional image;
performing an estimation step, the estimation step comprising applying external excitations to the photorealistic virtual object to create photorealistic virtual field measurements and comparing the photorealistic virtual field measurements with the physical field measurements and therefor sensing the physical object.

2. The method of claim 1, the method comprising using a time-history of the at least one 2 dimensional image.

3. The method according to claim 1, wherein sensing a physical object comprises estimating one or more quantities of the physical object, including:
States: including but not limited to positions, velocities, accelerations, strains, strain rates, currents;
Input: including but not limited to mechanical forces, mechanical torques, mechanical pressures, voltages;
Parameters: including but not limited to density, Young's moduli, Poisson's ratios, material parameters, physical dimensions, resistance, capacitance.

4. The method according to claim 3, wherein the method comprises providing a time history of the estimate of said quantities of the physical object.

5. The method according to claim 1, wherein the physical object is an electromechanical machine and/or component.

6. The method according to claim 1, wherein providing a photorealistic virtual object comprises creation of a photorealistic numerical model of the physical object.

7. The method according to claim 1, wherein performing a measurement step comprises combining outputs of physical sensors of which at least one is an imaging device for visualising the external surface of the physical object in at least one 2 dimensional image.

8. The method according to claim 1, wherein performing an estimation step comprises combining the photorealistic virtual field measurements with the physical field measurements to provide an estimate of the desired quantity or quantities and wherein the estimation step is based at least on the usage of a similarity metric between the at least one two dimensional image of the physical object or parts of the at least one two dimensional image of the physical object and the images generated by the photorealistic virtual object.

9. The method according to claim 5, wherein performing an estimation step comprises combining the photorealistic numerical model and measurement step to provide an estimate of desired electromechanical quantities and wherein the estimation step is based at least on the usage of a similarity metric between the at least one two dimensional image of the electromechanical machine or parts of the at least one two dimensional image of the physical object and the images generated by the photorealistic numerical model.

10. The method of claim 1, where the physical behavior of the photorealistic virtual object of the physical object is described by a static or dynamic model obtained as a discretized approximation of a system.

11. The method according to claim 10, wherein the discretized approximation of the system is described by one or a combination of ordinary differential, partial differential or differential-algebraic equations, finite element model, computational fluid dynamics model, flexible multibody model.

12. The method of claim 1, wherein the photorealistic virtual object of the physical object uses one or more linear and non-linear model order reduction techniques and/or wherein the model is solved in the time domain.

13. The method of claim 12, wherein the one or more linear or non-linear model order reduction techniques are one or more of component modes synthesis, Krylov based methods, proper orthogonal decomposition, dynamic mode decomposition, balanced truncation, discrete empirical interpolation method, energy conserving sampling and weighting.

14. The method of claim 1, wherein the estimation is obtained from a dynamic filtering techniques combining both videos, images and the photorealistic numerical model.

15. The method of claim 14, wherein the dynamic filtering techniques comprise one or more of Kalman-based techniques, Moving Horizon Estimation techniques or Luenberger observer.

16. The method of claim 3, wherein the estimation step allows for evaluation of stochastic error bounds of the estimated quantities of the physical object and/or wherein the method comprises measuring and using a subset of the quantities of the physical object as a known input to the photorealistic virtual object.

17. The method of claim 1, wherein the method comprises measuring and using further electromechanical quantities in addition to videos and camera images during the estimation step and/or wherein the physical field measurements of the physical object are deformed physical fields.

18. The method of claim 1, wherein providing a photorealistic virtual object comprises creating a numerical model of the physical object and texturizing the geometry of the model with at least one image.

19. A device comprising a processing system, the processing system being programmed for performing a method comprising:
providing a photorealistic virtual object of the physical object;
performing a measurement step, the measurement step comprising recording the physical object and acquiring physical field measurements of the physical object comprising at least one 2 dimensional image;
performing an estimation step, the estimation step comprising applying external excitations to the photorealistic virtual object to create photorealistic virtual field measurements and comparing the photorealistic virtual field measurements with the physical field measurements and therefor sensing the physical object.

20. A system for characterising a physical object, the system comprising:
at least one means for measuring quantities of the physical object;
a processor adapted to receive the output of the at least one means for measuring fields of the physical object and adapted to perform a method comprising:
providing a photorealistic virtual object of the physical object;
performing a measurement step, the measurement step comprising recording the physical object and acquiring physical field measurements of the physical object comprising at least one 2 dimensional image;
performing an estimation step, the estimation step comprising applying external excitations to the photorealistic virtual object to create photorealistic virtual field measurements and comparing the photorealistic virtual field measurements with the physical field measurements and therefor sensing the physical object.

* * * * *